US009725070B2

(12) United States Patent
Krishnan et al.

(10) Patent No.: US 9,725,070 B2
(45) Date of Patent: Aug. 8, 2017

(54) ELECTRONIC VEHICLE SECURITY SYSTEM DEVOID OF LOCK CYLINDERS

(71) Applicant: FORD GLOBAL TECHNOLOGIES, LLC, Dearborn, MI (US)

(72) Inventors: Venkatesh Krishnan, Canton, MI (US); Livianu Dorin Puscas, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 14/468,368

(22) Filed: Aug. 26, 2014

(65) Prior Publication Data

US 2016/0059826 A1    Mar. 3, 2016

(51) Int. Cl.
*G06K 19/00* (2006.01)
*B60R 25/24* (2013.01)
*G07C 9/00* (2006.01)

(52) U.S. Cl.
CPC .......... *B60R 25/24* (2013.01); *G07C 9/00007* (2013.01)

(58) Field of Classification Search
CPC ............................ B60R 25/24; G07C 9/00007
USPC ......................................................... 340/5.6
See application file for complete search history.

(56) References Cited

U.S. PATENT DOCUMENTS

| | | | |
|---|---|---|---|
| 4,137,985 A | | 2/1979 | Winchell |
| 5,696,408 A | * | 12/1997 | Man ........................ B60R 25/04 180/287 |
| 6,181,026 B1 | | 1/2001 | Treharne et al. |
| 6,292,718 B2 | * | 9/2001 | Staiger ................ B60R 16/0231 701/1 |
| 6,606,562 B1 | * | 8/2003 | Gifford .................. G07C 5/008 342/357.31 |
| 7,224,259 B2 | | 5/2007 | Belmond et al. |
| 9,159,219 B2 | * | 10/2015 | Magner .................. G08C 17/00 |
| 2001/0026214 A1 | * | 10/2001 | Onuma ................... B60R 25/00 340/5.72 |
| 2006/0053848 A1 | * | 3/2006 | Ghabra ................... B60R 25/04 70/252 |
| 2006/0232379 A1 | * | 10/2006 | Shelley ................... E05B 81/76 340/5.62 |
| 2009/0048689 A1 | * | 2/2009 | Pelton ................. B64D 45/0005 700/33 |

(Continued)

FOREIGN PATENT DOCUMENTS

| | | | |
|---|---|---|---|
| CN | 103174337 A | 6/2013 | |
| GB | 2496847 A * | 5/2013 | ............. B60R 25/24 |

(Continued)

OTHER PUBLICATIONS

English Machine Translation of CN103174337A.
English Machine Translation of JP2001115700A.
English Machine Translation of KR100818223B1.

*Primary Examiner* — Naomi Small
(74) *Attorney, Agent, or Firm* — Jason Rogers; King & Schickli, PLLC

(57) ABSTRACT

A vehicle security system includes a vehicle ignition switch, a door lock actuator, a primary vehicle entry and ignition control circuit, a backup vehicle access control circuit and a key including a principal vehicle control subsystem and a backup vehicle entry circuit. Advantageously, the system is devoid of any ignition lock cylinder, any door lock cylinder and any key blade thereby reducing vehicle manufacturing costs. A related method is also provided.

10 Claims, 5 Drawing Sheets

(56) References Cited

U.S. PATENT DOCUMENTS

| | | | | |
|---|---|---|---|---|
| 2010/0231351 A1* | 9/2010 | Lickfelt | ............ | B60R 25/04 |
| | | | | 340/5.6 |
| 2013/0042533 A1* | 2/2013 | Netherland, III | ...... | B60J 5/0479 |
| | | | | 49/358 |
| 2014/0039725 A1* | 1/2014 | Cho | ............ | B60R 25/24 |
| | | | | 701/2 |
| 2014/0159865 A1* | 6/2014 | Eto | ............ | G07C 9/00126 |
| | | | | 340/5.61 |
| 2015/0263651 A1* | 9/2015 | Tehranchi | ............ | H02P 29/032 |
| | | | | 318/434 |

FOREIGN PATENT DOCUMENTS

| | | |
|---|---|---|
| JP | 2001115700 A | 4/2001 |
| KR | 100818223 B1 | 4/2008 |

\* cited by examiner

ELECTRONIC VEHICLE SECURITY SYSTEM DEVOID OF LOCK CYLINDERS

TECHNICAL FIELD

This document relates generally to the vehicle equipment field and, more particularly, to an electronic vehicle security system that eliminates the use of key blades and is devoid of lock cylinders for the doors and ignition switch of the vehicle.

BACKGROUND

Pin tumbler locks in the form of cylinder locks have been used in vehicles for generations to limit access to and operation of the vehicles to authorized individuals in possession of a key matching those cylinder locks. Generally these cylinder locks include an outer casing or cylinder, a plug held in that cylinder, a keyway in the plug to receive a key blade and a set of spring-loaded key pins and corresponding driver pins.

The key blade is cut to a particular pattern or shape and is inserted into the keyway in order to operate the lock. When an improper key is inserted into the keyway, the key pins straddle the shear point where the plug meets the cylinder housing preventing the lock from opening or the ignition switch from turning to start the vehicle. In contrast, when the proper key is inserted into the keyway, the pins rise causing the meeting points of the key pins and cooperating driver pins to all align along the shear point where the plug meets the cylinder housing. This allows the plug to rotate thereby opening the door lock or turning the ignition switch of the vehicle.

For many years now vehicles have also incorporated an electronic security, immobilizer or magnetic coupled transponder system on the ignition switch. More specifically, the ignition switch includes an induction coil and the key is provided with a cooperating winding connected to a transponder. When the key is inserted into the keyway of the ignition switch, the induction coil is activated and sends out an electromagnetic field of energy. The windings associated with the transponder absorb that energy and power the electronic transponder to emit a signal. Typically the signal is an alphanumeric sequence that is considered an identification or key code. The induction coil reads the signal and sends it to the ignition control module. If the signal is recognized as an accepted identification code for authorized operation of the vehicle, other electronic components in the vehicle are set in the motion to allow the vehicle to start and the engine to continue running.

Essentially the new electronic immobilizer systems based on transponders are superior to key lock cylinders. They provide more than a billion unique combinations versus thousands of unique combinations for key lock cylinders. The electronic immobilizer systems have effectively rendered ignition key lock cylinders redundant secondary systems that are unnecessary. Thus, key lock systems are a legacy of an earlier age of vehicle design that now effectively add unnecessary cost to vehicle production.

This document relates to a vehicle security system devoid of any ignition lock cylinder, any door lock cylinder and keys including cut key blades for operation of such cylinders.

SUMMARY

In accordance with the purposes and benefits described herein, a vehicle security system is provided. That system comprises a vehicle ignition switch, a door lock actuator, a primary vehicle entry and ignition control circuit, a backup vehicle access circuit and a key. The primary vehicle entry and ignition control circuit is connected to the ignition switch and the lock actuator. The backup vehicle access control circuit is connected to the lock actuator. The key includes a principal vehicle control circuit and a backup vehicle entry circuit. Advantageously the vehicle security system is devoid of any ignition lock cylinder, any door lock cylinder and any key blade cut to operate any such lock cylinder.

In one possible embodiment the primary vehicle entry and ignition control circuit includes a receiver and a body control module powered by a primary vehicle power supply. The backup vehicle access circuit includes a backup power supply and a backup access control module. Further the principal vehicle control circuit includes a first actuator, a controller and a transmitter powered by a principal power source. The backup vehicle entry circuit includes a second actuator and a backup controller powered by a backup power source.

In one possible embodiment the vehicle security system further includes a passive entry circuit. That passive entry circuit includes a presence or touch sensor, a passive entry control module and a low frequency transmitter. In addition the key further includes a low frequency receiver.

Significantly, the vehicle security system allows the vehicle manufacturer to utilize a single key fob housing with a plurality of control buttons whether the key is for a passive entry passive start (PEPS) vehicle or a non-passive entry passive start (nPEPS) vehicle. The only difference between the two types of keys is the internal circuitry. This further allows the manufacturer to reduce production costs associated with a vehicle.

In some embodiments a key fob housing is provided having a plurality of control buttons. Further the key includes a common ignition switch engagement feature that is used to manually engage the ignition switch to start a nPEPS vehicle. In one possible embodiment the common ignition switch engagement feature is formed by the key fob housing.

In accordance with an additional aspect, a method is provided for reducing the cost of vehicle production. That method includes the steps of (a) equipping the vehicle with an electronic security system controlling vehicle entry and ignition and (b) omitting any ignition key lock cylinder from the vehicle. The method may further include omitting any door key lock cylinder and/or omitting any key blade from a key of the vehicle. In addition, the method may include providing a key fob with a common ignition switch feature and using that key fob as standard equipment for both PEPS and nPEPS vehicles that are manufactured.

In the following description, there is shown and described several preferred embodiments of the vehicle security system. As it should be realized, the vehicle security system is capable of other, different embodiments and its several details are capable of modification in various, obvious aspects all without departing from the vehicle security system and related method as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the vehicle security system and together with the description serve to explain certain principles thereof. In the drawings.

Reference will now be made in detail to the present preferred embodiment of the vehicle security system, examples of which are illustrated in the accompanying drawings.

DETAILED DESCRIPTION

Figure 1:
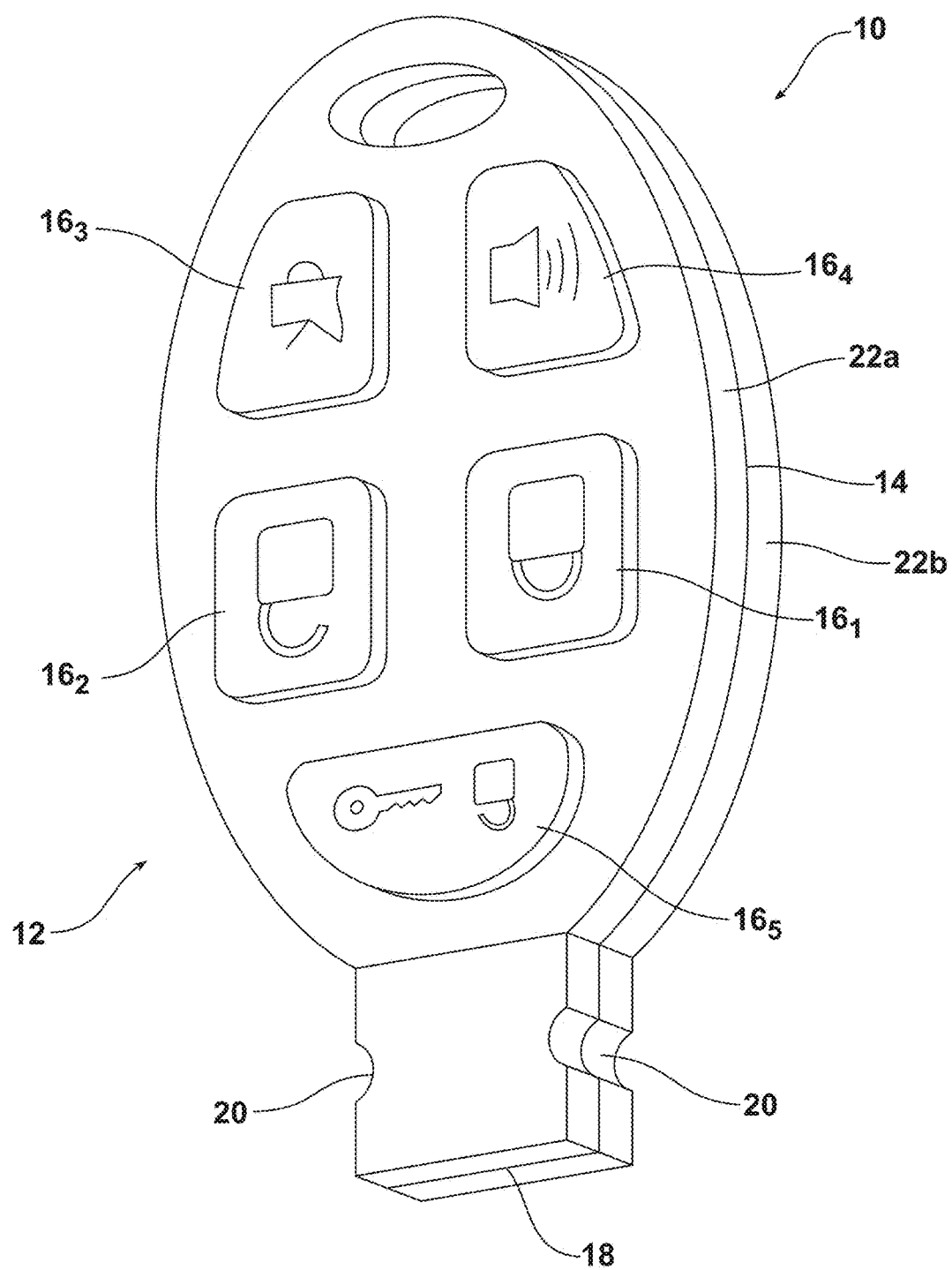
FIG. 1 is a perspective view of the front of a key fob used in conjunction with the vehicle security system.

Reference is now made to FIGS. 1-5, which considered together, fully illustrate the electronic vehicle security system 10. A key 12 for the system 10 is illustrated in FIG. 1. The key 12 includes a key fob housing 14 and a plurality of control buttons $16_1$-$16_5$. In the illustrated embodiment, the control button $16_1$ is depressed to lock a door or the doors of the associated vehicle V. Control button $16_2$ is depressed to unlock a door or the doors of the vehicle V. Control button $16_3$ is depressed in order to unlock the trunk lid of the vehicle V. Control button $16_4$ is depressed in order to cause the vehicle to sound an emergency alarm. Finally, control button $16_5$ is depressed to utilize the backup system to unlock the door of the vehicle in a manner that will be described in greater detail below.

As further illustrated in FIG. 1, the key 12 also includes a common ignition switch engagement feature 18 which may be inserted into and received in the ignition switch 44 of the nPEPS vehicle V as described in greater detail below in order to manually start and operate the vehicle when desired. In the illustrated embodiment the common ignition switch engagement feature 18 comprises a projecting rectangular lug with two opposing notches 20. Here it should be appreciated that the feature 18 may assume substantially any desired shape so long as the feature is common. By "common" it is meant that the feature 18 is standard equipment and may be received in substantially any ignition switch 44 on substantially any nPEPS vehicle V produced by that manufacturer. This commonality functions to reduce production costs without sacrificing security in any manner.

In one particularly useful embodiment, the key fob body or housing 14 and the common ignition switch engagement feature 18 are integrally molded together. More specifically, the key fob housing 14 and feature 18 are assembled from two molded sections 22a and 22b that are secured together after inserting the electronic components of the key 12 which are held within an internal cavity formed by those sections.

Figure 2:
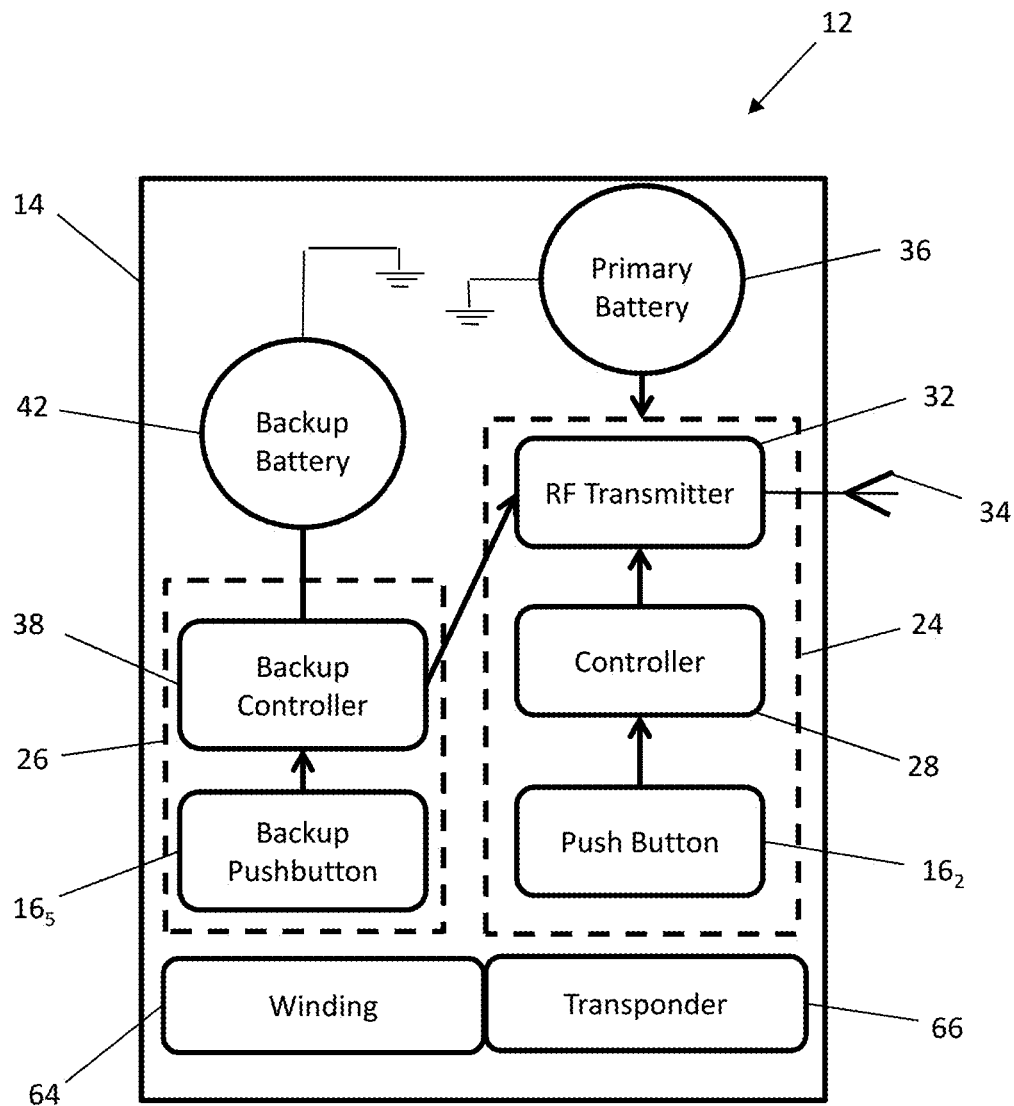
FIG. 2 is a schematic block diagram of the electronic components of a nPEPS key fob consistent with the vehicle security system.

Reference is now made to FIG. 2 schematically illustrating the electronic components found in a key 12 to be used to control the operation of a vehicle V by means of a nPEPS system.

More specifically, the key 12 includes a housing 14 which contains a principal vehicle control circuit 24 and a backup vehicle entry circuit 26. More specifically, the principal vehicle control circuit 24 includes a microprocessor controller or electronic control unit (ECU) 28, a cooperating actuator, such as push button $16_2$, and a radio frequency transmitter 32 incorporating an antenna 34. As illustrated, the principal vehicle control circuit 24 is powered by a principal power source 36 identified in the figure as the "primary battery".

The backup vehicle entry circuit 26 comprises a backup controller 38 in the form of a microprocessor controller or ECU, and a second actuator in the form of a push button $16_5$ for activating the controller 38. As illustrated, the backup vehicle entry circuit 26 is powered by a backup power source 42 identified in the drawing figure as the "backup battery".

Figure 3:
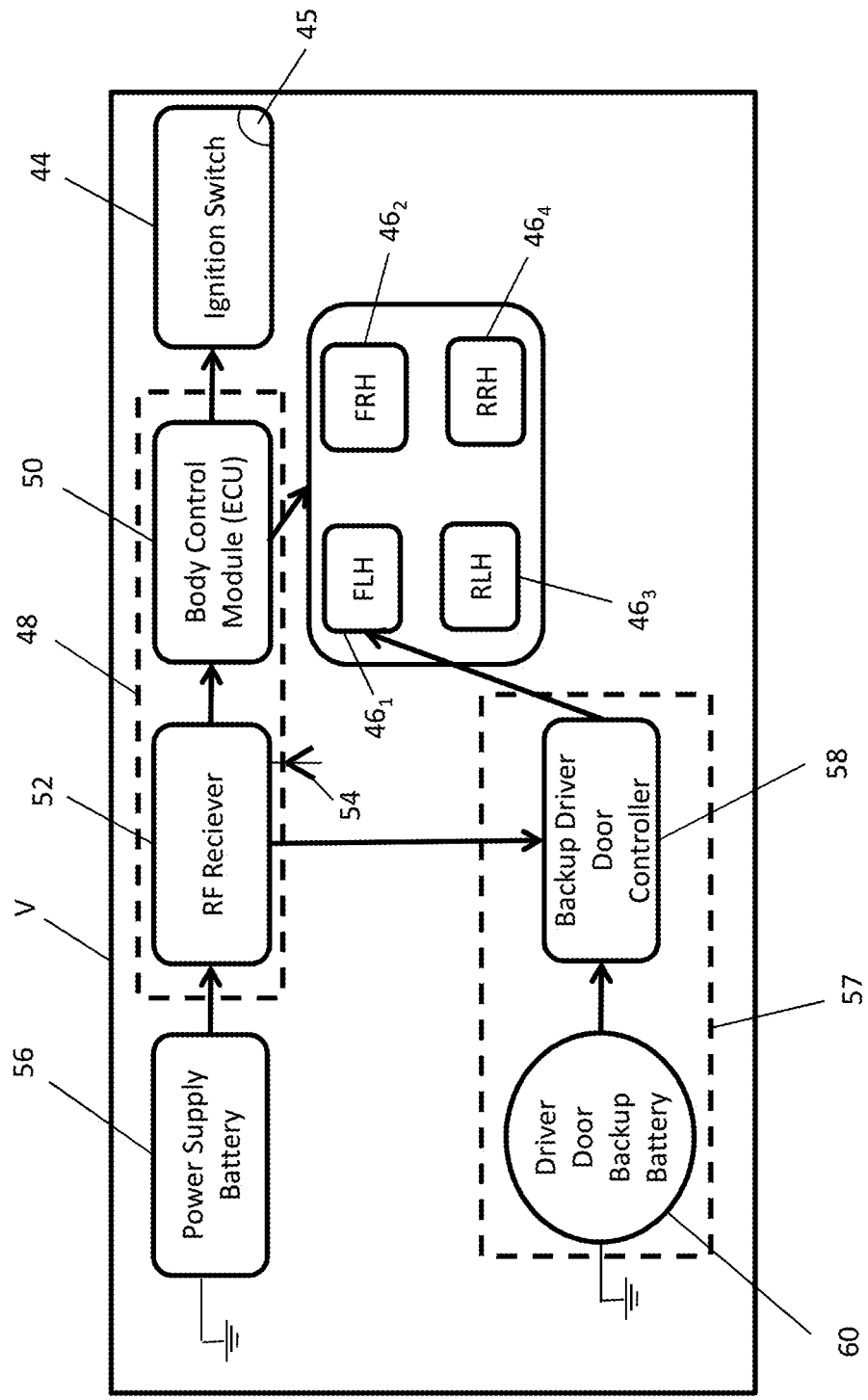
FIG. 3 is a schematic block diagram of the electronic components of the vehicle security system of a nPEPS vehicle responsive to the nPEPS key illustrated in FIG. 2.

The key 12 illustrated in FIG. 2 allows the owner or operator to control entry into and operation of the vehicle V schematically illustrated in FIG. 3. That vehicle includes a vehicle ignition switch 44 and at least one door lock actuator. In the illustrated embodiment, the vehicle V includes four door lock actuators $46_1$-$46_4$. Actuator $46_1$ operates the lock on the front left-hand or driver's door. Actuator $46_2$ operates the lock on the front right-hand or passenger door. Door actuator $46_3$ operates the lock on the rear left-hand side door while actuator $46_4$ operates the lock on the rear right-hand door.

As further illustrated in FIG. 3, the vehicle also includes a primary vehicle entry and ignition control circuit 48 including a body control module or ECU 50 and a radio frequency receiver 52 connected to an antenna 54. The primary vehicle entry and ignition control circuit 48 is powered by the primary vehicle power supply such as a battery 56. In addition vehicle V includes a backup vehicle access circuit 57 including a backup vehicle access controller or ECU 58 powered by a backup power supply 60.

In operation, the vehicle operator approaches the vehicle V, holds the key 12 and depresses the control button $16_2$ to unlock the driver's door of the vehicle. When the button $16_2$ is depressed, the controller 28 activates the radio frequency transmitter 32 to transmit a security code over the antenna 34 toward the vehicle V. The radio frequency receiver 52 of the primary vehicle entry and ignition control circuit 48 within the vehicle V receives the code and sends it to the body control module (BCM) 50 for entry authorization. If the BCM 50 recognizes the code as authentic to the vehicle, the BCM 50 sends a signal to the door lock actuator $46_1$ which is then activated to unlock the driver's side door. After entering the vehicle, the operator inserts the common ignition switch engagement feature 18 into the receiver of the ignition switch 44 and turns the ignition past the on position to the start position. When this is done an induction coil 45 in the ignition switch 44 sends out an electromagnetic field of energy. The windings 64 absorb that energy and power the transponder 66 in the key 12 to emit a coded signal. That coded signal may be an alphanumeric sequence which functions as an identification code. The induction coil 45 reads that signal and sends it to the BCM 50. In the event the BCM 50 recognizes the signal as an operator authorized code, BCM 50 initializes other electronic components of the vehicle to allow the starting of the vehicle V and continued operation thereof.

The above description assumes that the principal power source 36 in the key 12 has the necessary charge to allow the principal vehicle control circuit 24 to operate normally. In the event the principal power source 36 does not have the necessary charge to provide normal function of the principal vehicle control circuit 24, when the operator depresses the control button $16_2$, nothing will happen and the vehicle door will remain locked. In this situation the operator then depresses the backup control button $16_5$. The backup power source 42 provides the necessary power to the backup vehicle entry circuit 26 for the backup controller 38 to activate the transmitter 32 causing it to send the security code over the antenna 34 to the vehicle receiver 52 thereby initiating the unlocking of only the driver's door through backup door controller (58). Thus, it should be appreciated that the backup vehicle entry circuit 26, and its isolated power source 42 provide an electronic backup mechanism allowing entry into the vehicle V even when the primary battery 36 is discharged or is not functioning properly. It is important to note the backup system will not allow the car to start if the ECU or power supply battery (56) are not working. It only allows the user to get inside the car and take protection from the elements.

In the event, the primary vehicle power supply 56 has lost charge for any reason and is unable to power the primary vehicle entry and ignition control circuit 48, the backup vehicle access circuit 57 will unlock the driver's door by means of actuator 46. More specifically, the receiver 52 will transmit the security code received from the transmitter 32 to the backup controller 58. Upon recognizing the code as authentic, the controller 58 will send a signal to the door lock actuator 46, to unlock the driver's door and allow access to the vehicle V.

Figure 4:
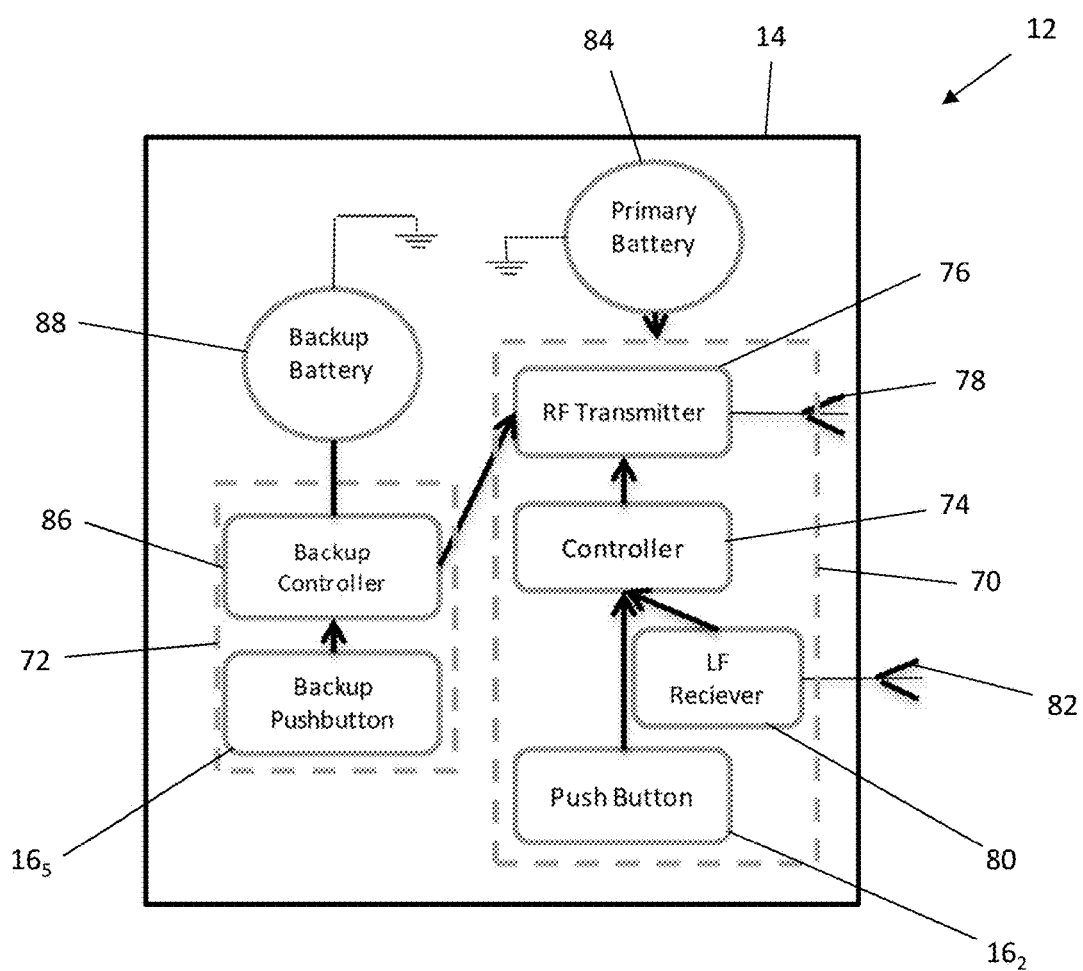
FIG. 4 is a schematic block diagram of the electronic components of a key fob for a PEPS vehicle.

Reference is now made to FIG. 4 which illustrates a key 14 for a vehicle equipped with a PEPS system. The key 14 includes a principal vehicle control circuit 70 and a backup vehicle entry circuit 72.

The principal vehicle control circuit 70 includes a controller 74 connected to a radio frequency transmitter 76, having an antenna 78, and a low-frequency receiver 80, connected to an antenna 82. The controller 74 is activated by the first actuator or push button $16_2$. As further illustrated, the principal vehicle control circuit 70 is powered by the principal power source or primary battery 84.

The backup vehicle entry circuit 72 includes a backup controller 86 activated by the second actuator or push button $16_5$ and powered by the backup power source or battery 88.

Figure 5:
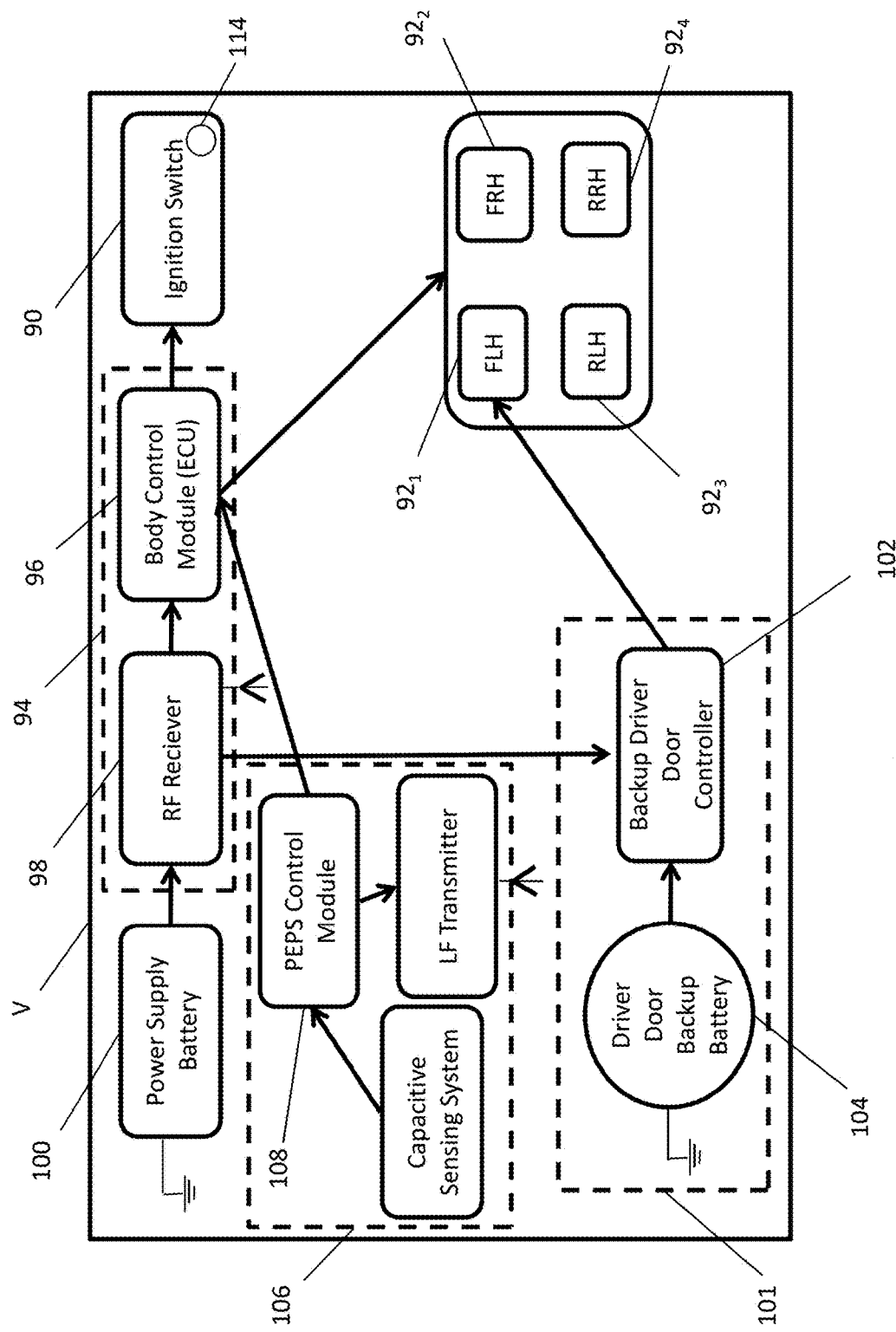
FIG. 5 is a schematic block diagram of the electronic components of the vehicle security system for a PEPS vehicle operated by the PEPS key fob illustrated in FIG. 4.

Reference is now made to FIG. 5 illustrating the vehicle V with a PEPS system that cooperates with the key 12 illustrated in FIG. 4.

As illustrated, the vehicle V includes an ignition switch 90 and at least one door lock actuator. In the illustrated embodiment four door lock actuators $92_1$-$92_4$ are provided. Door lock actuator $92_1$ activates the lock on the front left-hand or driver's door. Door lock actuators $92_2$-$92_4$ are connected to the other doors of the vehicle V.

The vehicle V also includes a primary vehicle entry and ignition control circuit 94 comprising the body control module or ECU 96 and the radio frequency receiver 98. The primary vehicle entry and ignition control circuit 94 is powered by the primary vehicle battery 100.

The vehicle V also includes a backup vehicle access or driver door circuit 101 which comprises the backup controller 102 which is powered by a backup battery 104.

Still further, the vehicle V includes a PEPS operating system or passive entry circuit 106 including a PEPS control module or ECU 108, a low-frequency transmitter 110 and a presence, touch or capacitive sensing system or sensor 112.

In normal operation, the operator approaches the vehicle V and inserts his hand into the door handle cavity of the driver's side door with the intention of pulling the handle. This breaks a capacitive field and the presence sensor 112 sends a signal to the PEPS control module 108. In response the PEPS control module 108 sends a signal causing the LF transmitter 110 to admit a low-frequency signal. The LF receiver 80 in the PEPS key 14 detects that signal and then sends an appropriate signal to the controller 74 which in turn sends a control signal to the RF transmitter 76 which transmits a key code over the antenna 78 toward the vehicle V. The vehicle receiver 98 receives the signal and sends it to the BCM 96 to determine the signal authenticity. Upon confirming the proper key code, the BCM sends a signal to the door lock actuator $92_1$ to unlock the lock on the driver's side door.

The passenger then completes the seamless opening the door with the handle, gets into the vehicle V and closes the door. The BCM 96 then establishes through sensors that the key 12 is inside of the vehicle. When the driver pushes the ignition button 114 of the ignition switch 90, the BCM 96 or other engine start electronic control unit allows the engine to start after again confirming the key code.

In the event the primary battery 84 of the key 12 does not have a sufficient charge to drive the principal vehicle control subsystem 70, when the operator depresses the push button $16_2$, nothing happens. In this situation the operator may then depress the backup push button $16_5$ activating the back controller 86 powered by the backup battery 88. Here it should be noted that the electrical circuit powered by the backup battery 88 is isolated from that powered by the primary battery 84. Upon pushing the backup push button $16_5$, the backup controller 86 is activated, sending a control signal to the RF transmitter 76 causing the key code to be transmitted by the transmitter through the antenna 78 toward the vehicle V. The RF receiver 98 receives the signal and sends it to backup driver door controller (102) which in turn unlocks only the front LH latch $92_1$. This will only allow the driver to enter the vehicle and start the vehicle if the power supply (100) and ECU (96) are operational and can confirm the key code from the key-fob.

If the primary power supply or battery 100 of the vehicle V is dead or sufficiently discharged, the BCM/ECU 96 will not operate. However, the backup vehicle access controller 102 will still be powered by the backup battery 104 so that any unlock signal sent by the transmitter 76 of the key will be received by the receiver 98. The key code will then be confirmed by the backup vehicle entry controller 102 and that controller will send an appropriate signal to the lock actuator $92_1$ to unlock the driver door thereby allowing the operator access to the vehicle. This will only allow the driver to enter the vehicle and but NOT start the vehicle.

In summary, numerous benefits result from employing the vehicle security system 10 disclosed this document. Significantly, a vehicle V is equipped with the electronic security system and any key blade and associated door key lock cylinders and ignition key lock cylinders are omitted. Instead a key blade is provided with a common ignition switch engagement feature 18 which will fit in the ignition switch of all nPEPS vehicles. This commonality reduces production costs of the key fob 14 and allows the manufacturer to use a single key fob body designed for both PEPS and nPEPS vehicles.

It should be appreciated that these benefits are achieved without compromising vehicle security. This is because a matching electronic key code must be confirmed before the vehicle will grant entry or the ignition will operate. Still further, the backup systems 26, 72 of the key and 58, 102 of the vehicle ensure that the door lock actuators $46_1$, $92_1$ may be operated under substantially any conditions to allow access to the vehicle. It should also be appreciated that the strength of the signal transmitted by the key transmitter 32, 76 may be monitored by the BCM 50, 96. If the signal is weaker than a predetermined level, the BCM 50, 96 will provide notice to the vehicle operator to charge or change the battery in the key 12 through a display module (not shown) in the vehicle V or via wireless connection by email or text message to the operator's computer or telephone. Similarly, the BCM 50, 96 may monitor the backup power supply 60, 104 for the same purpose and provide a similar notice if required.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle security system, comprising:
    a vehicle ignition switch;
    a door lock actuator;
    a primary vehicle entry and ignition control circuit connected to said ignition switch and said lock actuator, wherein said primary vehicle entry and ignition control circuit includes a receiver and a body control module powered by a primary vehicle power supply;
    a backup vehicle access control circuit connected to said lock actuator, wherein said backup vehicle access control circuit includes a backup vehicle access controller and a backup power supply for powering said backup vehicle access controller; and
    a key including a principle vehicle control circuit and a backup vehicle entry circuit wherein said vehicle security system is devoid of any ignition lock cylinder, any door lock cylinder and any key blade, wherein said principle vehicle control circuit includes a first actuator, a controller, a transmitter and a principle power source, and wherein said backup vehicle entry circuit includes a second actuator, a backup controller and a backup power source.

2. The system of claim 1, wherein said vehicle security system further includes a passive entry circuit.

3. The system of claim 2, wherein said passive entry circuit includes a presence sensor, a passive entry control module and a low frequency transmitter.

4. The system of claim 3, wherein said key further includes a low frequency receiver.

5. The system of claim 1, wherein said key includes a key fob housing having a plurality of control buttons.

6. The system of claim 5, wherein said key includes a common ignition switch engagement feature.

7. The system of claim 6, wherein said common ignition switch engagement feature is formed by said key fob housing.

8. The system of claim 7, wherein said key further includes a transponder and an associated winding and said ignition switch includes an induction coil.

9. The system of claim 5, wherein said key fob housing and said plurality of control buttons are identical whether said key is for a passive entry passive start vehicle or non-passive entry passive start vehicle.

10. A motor vehicle incorporating said vehicle security system of claim 1.

* * * * *